United States Patent
Coffey et al.

(10) Patent No.: US 10,897,282 B2
(45) Date of Patent: Jan. 19, 2021

(54) SYSTEMS AND METHODS FOR DETERMINING CABLE END LOCATION

(71) Applicant: CommScope Technologies LLC, Hickory, NC (US)

(72) Inventors: Joseph C. Coffey, Burnsville, MN (US); Joseph Polland, Eden Prairie, MN (US); Jason Bautista, Mayer, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/344,069

(22) PCT Filed: Nov. 29, 2017

(86) PCT No.: PCT/US2017/063694
§ 371 (c)(1),
(2) Date: Apr. 23, 2019

(87) PCT Pub. No.: WO2018/102405
PCT Pub. Date: Jun. 7, 2018

(65) Prior Publication Data
US 2020/0067567 A1    Feb. 27, 2020

Related U.S. Application Data

(60) Provisional application No. 62/428,813, filed on Dec. 1, 2016.

(51) Int. Cl.
*H04B 3/46* (2015.01)
*G06K 7/00* (2006.01)
*H04B 5/00* (2006.01)

(52) U.S. Cl.
CPC ............ *H04B 3/46* (2013.01); *G06K 7/0095* (2013.01); *H04B 5/0025* (2013.01)

(58) Field of Classification Search
CPC combination set(s) only.
See application file for complete search history.

(56) References Cited

U.S. PATENT DOCUMENTS 6,968,994 B1   11/2005   Smith
8,115,631 B2 *  2/2012   Lange ............... H04Q 9/00
                                            340/10.1

(Continued)

FOREIGN PATENT DOCUMENTS

EP    1837799 B1    7/2015

OTHER PUBLICATIONS

International Bureau, "International Preliminary Report on Patentability from PCT Application No. PCT/US2017/063694 dated Jun. 13, 2019", from Foreign Counterpart to U.S. Appl. No. 16/344,069, pp. 1-14, Published: WO.

(Continued)

*Primary Examiner* — Phung-Hoang J Nguyen
(74) *Attorney, Agent, or Firm* — Fogg & Powers LLC (57) ABSTRACT

A system for identifying a cable end is provided. The system comprises: a near end for the cable, wherein the near end is visible; a far end for the cable, wherein the far end is in a hidden location; a cover assembly connected to the far end of the cable, wherein the cover assembly includes a near field communication device and a transponder, wherein the near field communication device transmits a signal through the transponder; and a device configured to communicate with the near field communication device, and further configured to facilitate a user to find the location of the cap connected to the far end.

16 Claims, 7 Drawing Sheets

(56) References Cited

U.S. PATENT DOCUMENTS

| | | |
|---|---|---|
| 9,449,206 B2 * | 9/2016 | DeCusatis .......... G06K 7/10158 |
| 2008/0133047 A1 | 6/2008 | Best et al. |
| 2010/0085156 A1 * | 4/2010 | Tucker ............... G06K 19/0723 |
| | | 340/10.1 |
| 2013/0181816 A1 * | 7/2013 | Carlson, Jr. ............. G09F 3/205 |
| | | 340/10.1 |
| 2014/0178007 A1 * | 6/2014 | Momotsu ............. G02B 6/3849 |
| | | 385/77 |

OTHER PUBLICATIONS

International Searching Authority, "International Search Report and Written Opinion from PCT Application No. PCT/US2017/063694 dated Mar. 13, 2018", from Foreign Counterpart to U.S. Appl. No. 16/344,069, pp. 1-17, Published: WO.

European Patent Office, "Communication pursuant to Rule 164(1) EPC from EP Application No. 17875415.6", from Foreign Counterpart to U.S. Appl. No. 161344,069, dated Jul. 6, 2020, p. 1 through 16, Published: EP.

European Patent Office, "Extended European Search Report from EP Application No. 17875415.6", from Foreign Counterpart to U.S. Appl. No. 16/344,069, dated Oct. 9, 2020, pp. 1 through 13, Published: EP.

\* cited by examiner

SYSTEMS AND METHODS FOR DETERMINING CABLE END LOCATION

CROSS-REFERENCE TO RELATED APPLICATIONS

This application claims priority to International Patent Application No. PCT/US2017/063694 filed on Nov. 29, 2017, which claims priority to U.S. Provisional Patent Application No. 62/428,813 filed on Dec. 1, 2016.

BACKGROUND

Frequently, in networks, wireless devices are connected to switches, routers or other network elements through copper cables. For example, the copper cables may be local area network (LAN) grade CAT.X copper cable such that both information and power may be provided through the cable to the wireless device. The cables may originate in an equipment room, where a near end of the cables is terminated at an RJ45 jack panel using an insulation-displacement contact (IDC) termination or other connective means. While the near end of the cables is located at a panel, the other end of the cable, the far end, is frequently terminated at the location of an installed wireless device that is installed in the space above a finished ceiling.

In many cable installations, cabling may be installed before the installation of the wireless devices. The pre-installation of cabling before the installation of the wireless devices may result in unused and un-terminated cables that are stored for period of time in the ceiling. They may be stored in the ceiling until the time when they are connected to a wireless device or other network element. Frequently, minimal identification is applied to the cables during installation and, often, a different technician may install the wireless devices to the end of the cable that is in the ceiling than the technician who installed the cable at the panel.

When a new Wi-Fi or wireless device is installed or commissioned, it may be necessary to identify the connecting cable for the device at both the near and far end of the cable. Frequently, initial installations are manually entered in a record of the cabling. As the far end of the cable is left unterminated, the records of the cabling may only have a single ended record corresponding with the near end of the cable connected at the panel. Between the time of initial installation of the cable and the time of installation and commission of the device, the installed cables may be moved within the same general area due to other work activity that also occurs in the space above the finished ceiling. The other work activity may include electrical, lighting, HVAC, plumbing, among other work activities. When the cables are moved, finding a desired cable end in the ceiling may be very difficult and laborious for the installer. As cabling frequently has minimal identification, the difficulty in finding the desired cable is only increased. Due to the above described challenge in finding a desired cable end, the cost of installation is increased.

SUMMARY

A system for identifying a cable end is provided. The system comprises: a near end for the cable, wherein the near end is visible; a far end for the cable, wherein the far end is in a hidden location; a cover assembly connected to the far end of the cable, wherein the cover assembly includes a near field communication device and a transponder, wherein the near field communication device transmits a signal through the transponder; and a device configured to communicate with the near field communication device, and further configured to facilitate a user to find the location of the cap connected to the far end.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

Systems and embodiments described herein help a technician locate previously installed ends of cables that are connected to located ends of a cable. In one embodiment, a technique for storing and/or identifying an absolute (i.e. a geographic) location of cable ends is provided. This is unlike other techniques which teach how to identify the logical location of a cable end terminated in a port, e.g. of a switch or router, relative to another port. In another embodiment, a technique for identifying a relative distance and/or location of cable ends with respect to a device, e.g. being used by a technician seeking the cable ends.

For example, a located end (or near end) of a cable may be connected to a patch panel and the far end (or end to be located) may be installed at a location other than the patch panel, such as in a ceiling or wall. In some implementations, the far end of the cable may be installed without terminating the far end with a device. At some time after the cable is installed, the far end of the cable may be terminated with a device. To help protect the far end of the cable after it is installed and before it is terminated with the device, a cover assembly such as a dust cap may be placed over the far end of the cable.

In certain embodiments described herein, the dust cap may include a system capable of near field communication. For example, the dust cap may include a system that is capable of communicating through RFID, Bluetooth, Bluetooth Low Energy, or other communication standards that permit near field communication. To communicate with the transmitter located on the dust cap or the far end, a near end power and interface converter (NEPIC) may be connected to the near end of the cable. For example, the NEPIC may be connected to the cable through an adapter in a patch panel or directly connected to the cable. The NEPIC provides power through the cable to the transmitter located at the far end of the cable. When the transmitter that is located at the far end of the cable receives power, the transmitter is able to communicate with other devices. In one implementation, the transmitter may communicate with an RFID interrogator that is placed within range of the signal emitted by the transmitter using RFID technology. In an alternative implementation, the transmitter may communicate with other devices through Bluetooth communications or other communication technology used for personal area networks. In at least one exemplary implementation, the NEPIC may also include an interface for communicating through a wireless interface. As the NEPIC powers the transmitter at the far end of the cable, a technician or other individual may more easily locate the far end of the cable after installation.

Figure 1:
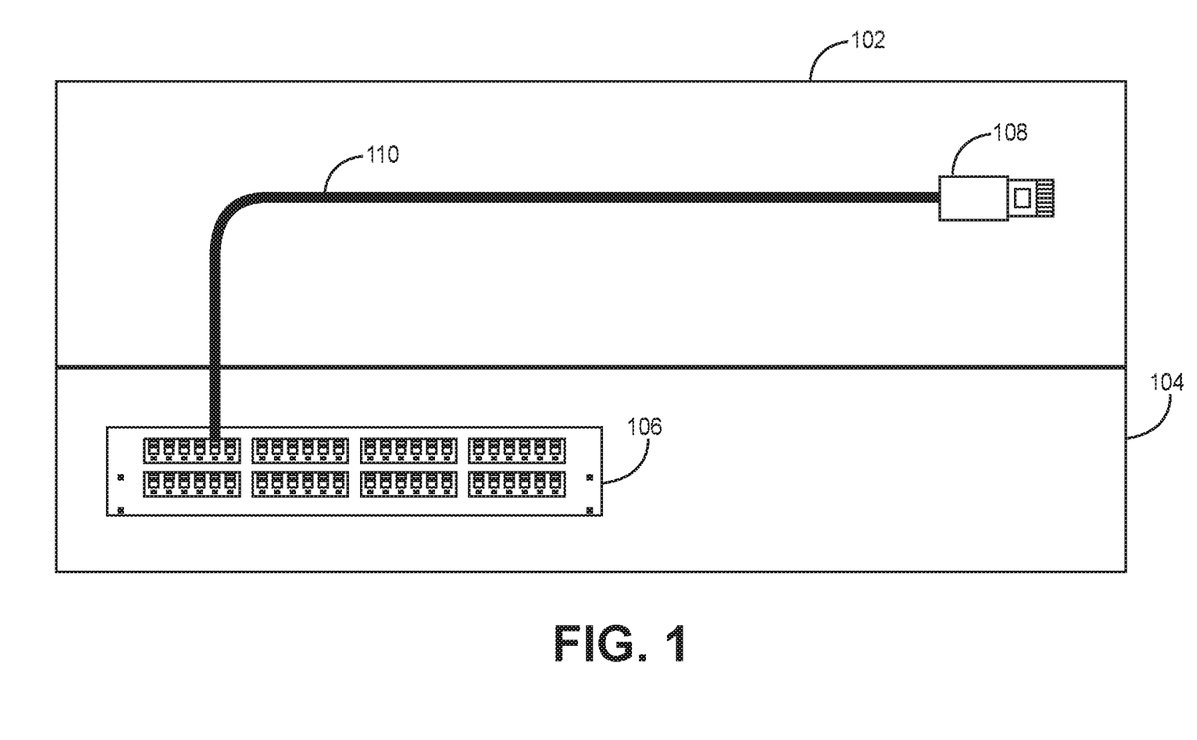
FIG. 1 is a diagram illustrating an exemplary embodiment of an installed cable.

FIG. 1 is a diagram illustrating an installed cable 110 having an unterminated far end 108. As shown, the cable 110 may be a cable that is capable of transmitting power as well as information. For example, the cable 110 may be an Ethernet cable such as a CAT.5e, CAT 6, or CAT.6A, where the cable is comprised of four pairs of metallic conductive wires, such as copper wires. In alternative implementations, the cable 110 may be a fiber optic cable or other cable capable of transmitting information. In at least one implementation, the unterminated far end 108 of the cable 110 may be coupled to an RJ-45 plug, or other type of connector, wherein the connector may be connected to another device at a point in time after the installation of the cable 110.

In certain installations, the far end 108 of the cable 110 may be installed in a hidden region 102. For example, the hidden region 102 may be an area within a ceiling, behind a wall, under a floor, or other area. As used herein, the hidden region 102 refers to an area where the far end 108 is accessible but hidden from view such that the exact location of the far end 108 is unknown. The near end of the cable 110 may be located in a viewable region 104. For example, the viewable region 104 may be an equipment room or other region where the location of the near end of the cable 110 may be apparent from visual inspection. In certain implementations, the near end of the cable 110 may be terminated at a panel 106, e.g. in a specific port. For example, the near end of the cable 110 may be terminated at an RJ-45 jack panel using IDC termination.

When the cable 110 is installed, it may be connected to a device in the viewable region 104, such as the panel 106. The cable then may be run from the panel 106 into the hidden region 102 where it can be connected to another device, such as a wireless device. Further, an installer may enter physical text descriptions and location at installation time, as well as installation date, cable types among other information and store them in memory associated with the cable 110. Data describing the cable may be retrieved later when trying to locate cable. The same information describing the cable may also be stored in a database in the cloud as an independent record. The dust cap may include a radio such a Bluetooth, a Bluetooth Low Energy, an IEEE802.15.4, a Zigbee transceiver, or a radio frequency identifier (RFID). In one embodiment, the installer communicatively couples to the dust cap through a device using a NEPIC or wireless connection to the radio (as described elsewhere herein), and extracts data describing the radio and/or executable software such as device address, protocol stack version, RFID identifier and/or its executable software version. This radio and/or executable software data may be communicated to and stored in a database in the cloud, and, e.g., saved with the independent record.

In certain installations, the cable 110 is installed but not terminated. Unterminated cables (like cable 110) may be used at a future point in time for connection to wireless devices as needed to provide the desired network functionality. However, between the time of installation and the future point in time when the cable 110 is connected to a wireless device, installation of other systems in and through the hidden region 102 may cause the far end 108 of the cable 110 to move from the location of its initial installation. For example, the far end 108 of the cable 110 could be moved for the installation of heating, ventilation, and air conditioning systems; electrical wiring; plumbing; other communication wiring; and other types of installation. Also, different individuals may perform the initial installation of the cable 110 and the connection of the far end 108 of the cable 110 to another device such that the individual connecting the far end 108 of the cable 110 may be unfamiliar with the exact location of the far end 108 of the cable 110.

In certain embodiments, to aid in locating the far end 108 of the cable 110, a device may be temporarily connected to the far end 108 of the cable 110. For example, a dust cap or cover assembly may be attached to a jack attached to the far end 108. As used herein, a dust cap refers to an assembly associated with the far end 108 of the cable 110. Further, the jack may be an RJ-45 plug and the dust cap connects to the RJ-45 plug such that power and information provided into the near end of the cable 110 at the panel 106 may be communicated to the dust cap and any electronics that exist thereon. Also, at the time of installation, information describing the cable may be stored in a memory located on the dust cap. The same information describing the cable may also be stored in database in the cloud at installation time. Electronics located on the dust cap are then discoverable by a technician using either RFID or personal area network technology. In at least one particular embodiment, one option for the dust cap (and for cable 110 above) is that installation information may get downloaded to the dust cap after installation time or at final deployment time. For example, in the event the characteristics and location of the dust cap has changed, e.g. 1 year after installation, a technician switches round dust caps on cables. Such that on the day of final deployment, x days or years later, the technician may read cable information from a cloud database (cable information may state data like closet a, shelf 5 panel 4 port 1, cat5 cable, 100 meters length, cable Id), then download the cable information or a subset of the cable information to the dust cap using the NEPIC on port 1. At this point the dust cap for the cable to be found has the correct information to transmit on the day of final installation.

Figure 2:
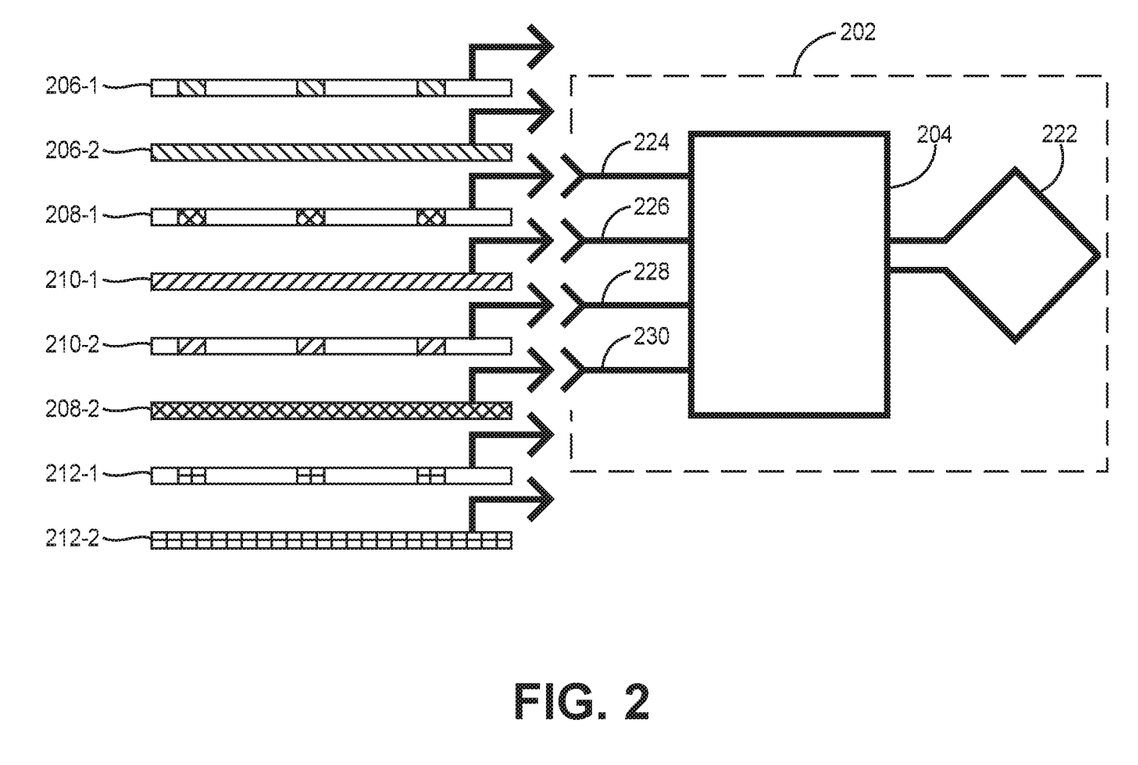
FIG. 2 is a diagram illustrating a schematic for an exemplary embodiment of a dust cap.

FIG. 2 is a schematic illustrating dust cap electronics 202 connected to a cable end 222. In certain implementations, a dust cap may slide on over the RJ-45 plug and couple the dust cap electronics 202 to the contacts on the RJ-45 plug. As described above, the cable may be an Ethernet cable having four pairs of metallic conductive wires 206-1, 206-2, 208-1, 208-2, 210-1, 210-2, 212-1, and 212-2. In at least one implementation, two pairs of the metallic conductive wires may be coupled to electric contacts that form a serial interface in the dust cap electronics 202. For example, the metallic conductive wires 208-1 may contact a VDD contact 224 for the dust cap electronics 202. A wire 210-1 may contact a system clock contact 226, a wire 210-2 may contact a system data contact 228, and a wire 208-2 may contact a VSS contact 230. Through the various contacts available on the dust cap electronics 202, a NEPIC may communicate through an Ethernet cable with the dust cap electronics 202.

In at least one implementation, the dust cap electronics 202 may include an NFC device 204. The NFC device 204 may be able to communicate with other devices used by a technician through signals that are radiated through an antenna 222. For example, the NFC device 204 may communicate using personal area network technology such as Bluetooth, Bluetooth Low Energy, Zigbee, or IEEE 802.15.4. Also, the NFC device 204 may be able to communicate through the use of RFID technology. In both, examples, the NFC device 204 may communicate with a technician through the use of a near field communication technology.

Figure 3:
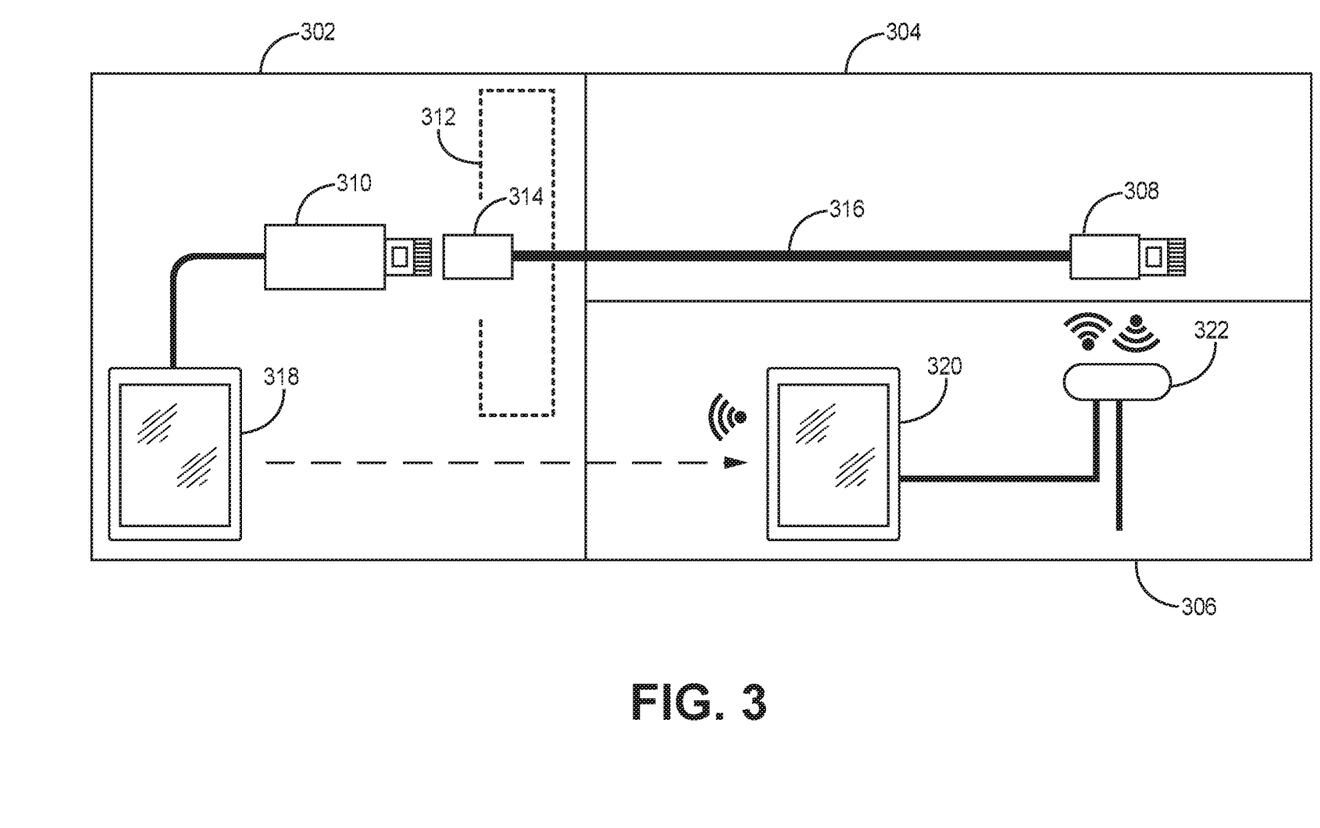
FIG. 3 is a diagram illustrating an exemplary embodiment of an installed cable having a dust cap that communicates using RFID technology.

FIG. 3 is a block diagram illustrating the use of RFID to locate a far end 308 of a cable 316. As described above, with respect to FIG. 1, the far end 308 of the cable 316 may be installed within a hidden region 304 and terminated with an RJ-45 plug and the near end 314 of the cable 316 may be terminated with an RJ-45 jack at a patch panel 312. The patch panel 312 may be any location where cables such as cable 316 may be connected. The patch panel 312 may be located in a viewable region 302 such as an equipment closet or other area where an individual may enter an area to view the near end 314 of the cable 316.

In certain implementations, when a technician wants to locate the far end 308 of the cable 316, a NEPIC 310 may be inserted into a port in the patch panel 312, where the port in the patch panel 312 couples the NEPIC 310 to the near end 314. In an alternative implementation, the NEPIC 310 is able to be inserted into multiple ports in panel 312. In certain embodiments, the NEPIC 310 is capable of communicating with the far end 308 through the cable 316. The NEPIC 310 may communicate with a device 318 through a communication link such as a USB cable, a Wi-Fi network, Bluetooth connection, or any other means for communicating data from the NEPIC 310 to the device 318. In at least one implementation, the NEPIC 310 receives power from the device 318. Alternatively, the NEPIC 310 may receive power from the patch panel, a plug, Power Over Ethernet (PoE), or other source of electrical power, where the received electrical power may be used to drive a cap coupled to the far end 308 of the cable 316.

As the NEPIC 310 is coupled into the patch panel and possibly providing power to the far end 318 of the cable 316, the NEPIC may power electronics located on the cap that enable RFID communications. The RFID communications located at the far end 318 allows a user to take a device 320 into a proximate region 306 and communicate with the RFID communications such that the exact location of the far end 308 may be found. The device 320 may be the same device as device 318. Alternatively, the device 320 may be a device other than device 318. To communicate with the electronics on the cap, the device 320 may be coupled to a RFID interrogator 322. The RFID interrogator 322 may receive a signal emitted by an RFID antenna located on the cap at the far end 308.

The RFID electronics located on the cap at the far end 308 may include an integrated circuit that is equipped with a transponder and a serial interface that couples to the cable 316 as described above in FIG. 2. The integrated circuit of the RFID electronics may be able to emit a signal at a low, high, or ultra-high frequency. The choice of frequencies may determine the range capabilities of the RFID electronics and the cost for the RFID electronics. In some implementations, the RFID electronics may be passive, such that power is not required from the NEPIC. Alternatively, the RFID electronics may be active/semi-active such that they use power from the NEPIC or other power source to transmit a signal through the transponder.

When the RFID electronics are passive, a technician may place the RFID interrogator 322 near the RFID electronics on the far end 308. An RF signal from the RFID interrogator energizes the RFID electronics at the far end. The energized RFID electronics then become active and modulates an RF carrier to send data back to the interrogator. The data may include a unique identifier for a cable end at the location being interrogated. Identifiers may be created to be globally unique, such that two identifiers may not be the same. Passive RFID electronics, while cheaper than active RFID electronics, may be more difficult to find within a hidden region 304 as the interrogator 322 may have to essentially find the far end 308 before using the interrogator 322 to energize the RFID electronics on the cap of the far end 308, depending on the range of the signals based on the frequencies being used in the communication.

In certain implementations, the RFID tags may be active or semi-active. Such that they receive power from another power source. For example, a NEPIC 310 may be inserted into an RJ-45 jack at a patch panel 312, where the RJ-45 jack is associated with the near end 314 of the cable 316. The NEPIC 310 may provide power through the cable 316, which is received by the RFID electronics through a serial interface. An integrated circuit in the RFID electronics then uses the power to modulate an RF carrier to transmit data to an interrogator 322 that may be potentially near the far end 308 of the cable 316. When the interrogator 322 receives the signal from the RFID electronics at the far end 308, a technician may use the data to identify the location of the RFID electronics. Further, when the NEPIC 310 is inserted into the RJ-45 jack in the panel 312, a switch that may be located on the NEPIC 310 may be turned on, be the switch a button or other type of switch. Alternatively, the NEPIC 310 may not have a switch such that the NEPIC 310 may be turned on/off by a GUI or other user interface on device 318 such that there is no physical switch located on the NEPIC 310. When the switch is turned on, the NEPIC 310 sends a signal to the RFID electronics to drive an LED. Upon reception of the signal, the LED turns on, which may help identify the far end 308 that is associated with the port connected to the near end 314 and the NEPIC 310.

Figure 4:
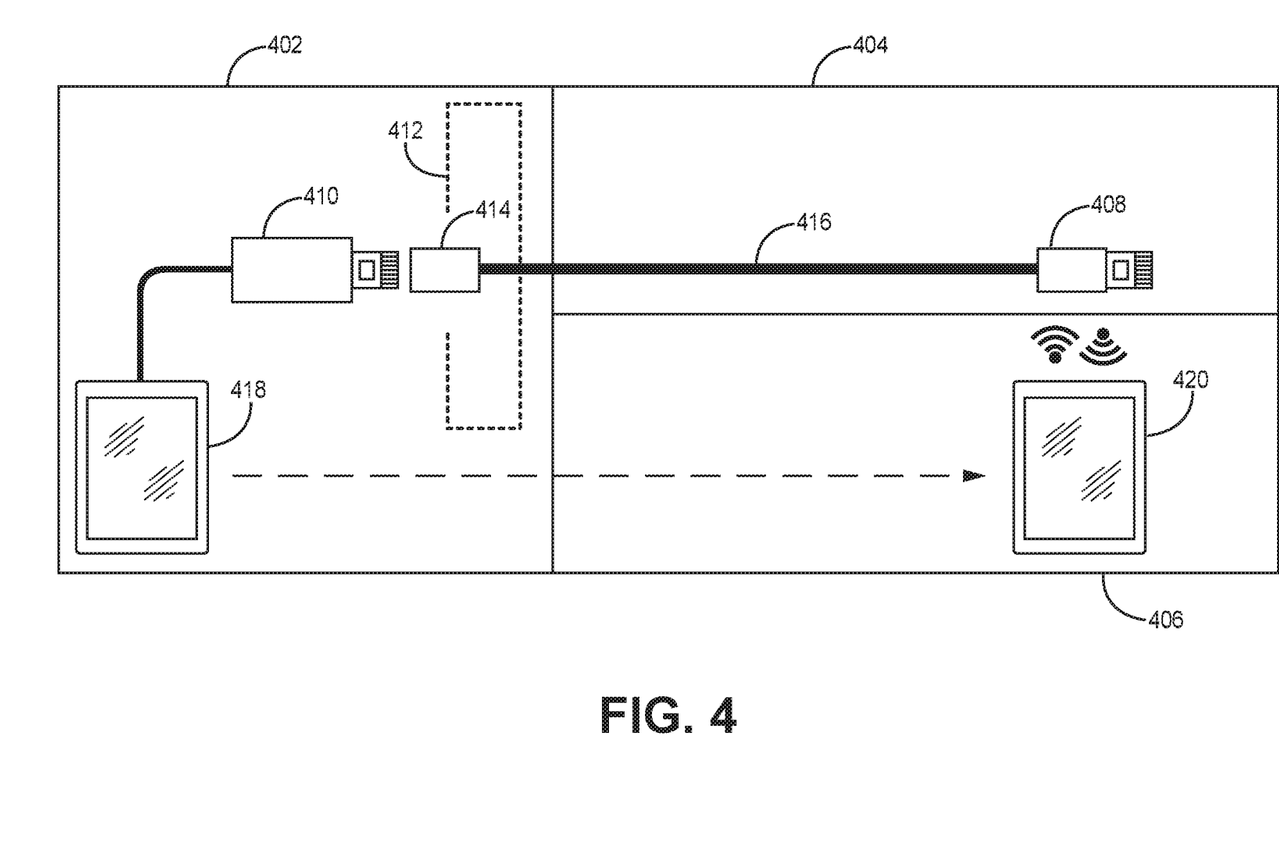
FIG. 4 is a diagram illustrating an exemplary embodiment of an installed cable having a dust cap that communicates using personal area networks.

FIG. 4 illustrates an alternative implementation of a system for an aid in identifying the location of a far end 408. As illustrated in FIG. 4, a near end 414 of a cable 416 is connected to a panel 412 in an accessible region 402 and the far end 408 is located within a hidden region 404 in a manner similar to the arrangement described above with regards to FIG. 3. However, the far end 408 may be connected to a dust cap that includes a system-on-chip capable of communicating using personal area network technologies as compared to RFID technologies. The system-on-chip may include a processor, a memory, and a wireless transmitter. The system-on-chip may receive power through a serial interface, where the power is transmitted from a NEPIC 410 connected to the near end 414 of the cable 416 through the panel 412. Alternatively, the dust cap may include a battery that provides electrical power to the system-on-chip on the dust cap.

When the system-on-chip receives power from the NEPIC or other power source, the system-on-chip may begin to transmit a beacon to alert other devices of the presence of the system-on-chip, where the other devices communicate using the same personal area network technologies as the system-on-chip. When the system-on-chip receives power from a battery located on the dust cap, the system-on-chip may periodically transmit a beacon. The period of time is small enough such that a mobile device is able to identify the beacon but long enough so that the battery power lasts until at least the cable is located. The presence of a beacon may allow a technician to begin the process of locating the far end 408 of the cable 416. Further, a NEPIC may provide physical location values retrieved from the NEPIC via the Bluetooth dust cap. The physical location values for the NEPIC may also possibly be saved on the NFC device of the dust cap.

In certain embodiments, memory on the system-on-chip may store identifying information that may aid in the pairing of the system-on-chip with other Bluetooth devices. The memory may be an EEPROM or other type of non-volatile memory. When the system-on-chip begins to transmit a beacon, the system-on-chip may access identifying information stored in the memory and transmit the identifying information as part of the beacon. A technician may connect the NEPIC 410 to the near end 414 of the cable 416. The NEPIC 410 may then provide power to the system-on-chip located on the dust cap connected to the far end 408 of the cable 416. When the system-on-chip receives the power, the system-on-chip begins to transmit a beacon. The technician may then take a mobile device 420 that is capable of communicating with the system-on-chip and use the transmitted beacon to pair the mobile device 420 with the system-on-chip. When the mobile device is paired with the system-on-chip, the technician can identify the location of the system-on-chip, and thus the selected cable end or connector, using a received signal strength indication (RSSI), and/or time of flight data to obtain distance to the system-on-chip and angle of arrival data to obtain direction of the system-on-chip.

The use of personal area network technologies like Bluetooth, Bluetooth Low Energy, IEEE 802.15.4, and other personal area technologies may also allow information about the cable to be gathered at the near end 414 by using a serial protocol between the NEPIC 410 and the system-on-chip within the dust cap at the far end 408. For example, cable end identification information stored in the EEPROM of the system-on-chip may be transmitted to the NEPIC 410 through the cable 416. The NEPIC 410 may then provide the identifying information to a mobile device 418. The mobile device 418 may be connected to the NEPIC 410 through a USB/lightning connection, or the mobile device 418 may be connected through a personal area network. Further, an LED may be installed on the dust cap such that the LED may be on when the system-on-chip receives power from the NEPIC 410. In certain implementations that include an LED, the LED may be controlled by a mobile device.

In at least one implementation, during initial installation of the cable, a technician may install the cable, and configures the location (campus, building, room, closet, shelf, panel, port), possible GPS coordinate, and cable type, length, install date, installer, etc. using a mobile device 418. Some of the information may be uploaded to the far end personal area network device/RFID device. The information may also be uploaded to a centralized database in the cloud.

The use of a personal area network technology, such as Bluetooth, helps a technician, with no prior knowledge of the location of the far end 408, find the location of the far end 408. Further, a standard mobile device may be capable of communicating with the dust cap using the desired personal area network technology.

Figure 5:
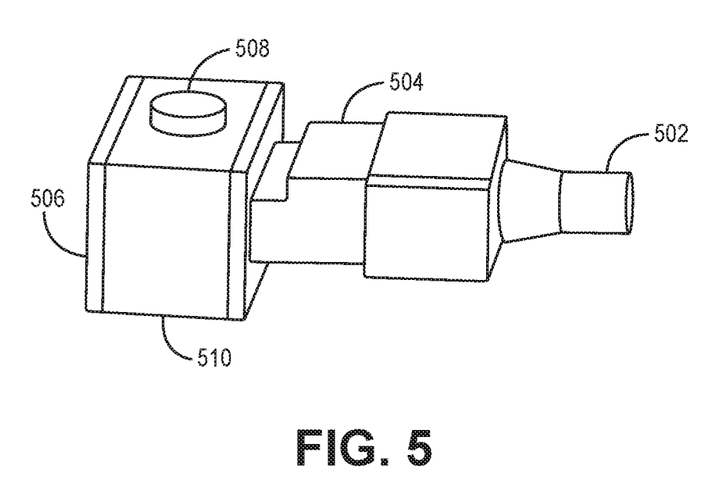
FIG. 5 is a diagram illustrating an exemplary embodiment of a dust cap connected to an end of a cable, where the dust cap includes an LED.

FIG. 5 illustrates a dust cap 506 inserted over a RJ-45 plug 504 that is connected to the end of a cable 502. As illustrated, the dust cap 506 includes an LED 510 and a switch 508. The LED may be controlled by a NEPIC or by a mobile device. The controllable characteristics of the LED include whether the LED is on or off, the cadence of the LED, and the color of the LED. Further, the dust cap 506 may also include a switch 508. When an installer finds the dust cap 506 at the far end and turns on the switch 508, information associated with the dust cap 506 may be identified on a mobile device that is paired to the dust cap 506. When the dust cap 506 is identified, the installer may be able to turn on the LED either directly or through a connected NEPIC to get visual confirmation that the dust cap 506 is correctly installed and identified.

Figure 6:
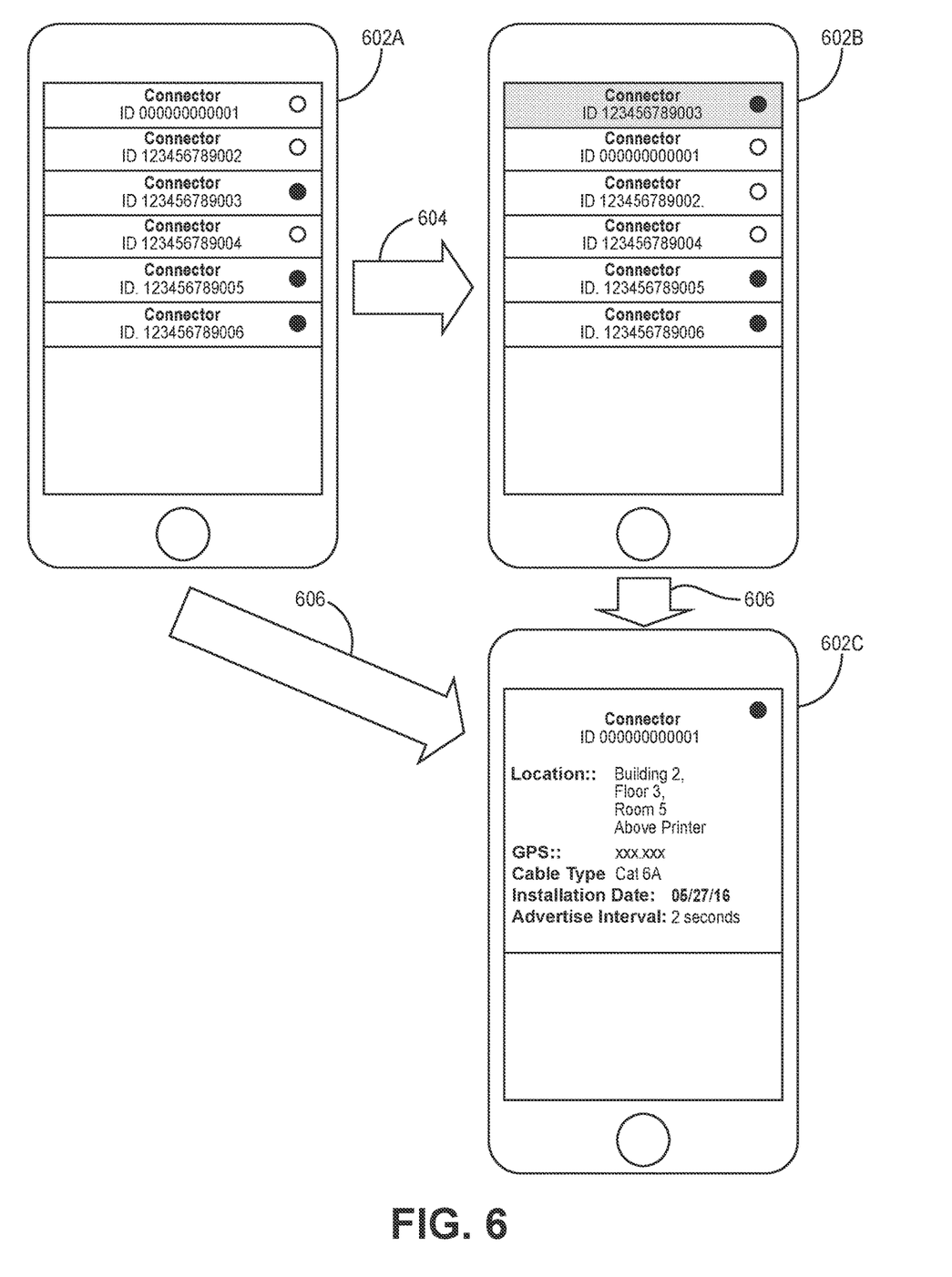
FIG. 6 is a diagram illustrating exemplary embodiments of screens on a device that identify different connected dust caps.

FIG. 6 illustrates a mobile device that is paired to multiple dust caps through a personal area network. FIG. 6 further illustrates different screen captures 602A-602C from an application that is executing on the mobile device along with actions that are performed that causes the screen to transition from one screen to another. The initial screen 602A illustrates that the mobile device is connected to multiple components through personal area network technologies such as Bluetooth. For example, the mobile device may be connected to NEPICs and dust caps (connectors). As illustrated, the screen 602A is connected to multiple dust caps and the dust caps are identified by an ID number. An ID number, or cable end ID number, is a unique identifier for each connector, which can be for example a device identifier associated with the radio of the dust cap, or an identifier assigned by an installer or technician. Further, the identification for each connector may display the state of an LED for that particular connector. In certain implementations, when selecting the LED for a particular connector, one may also be able to control the LED state. For example, a pop up menu may appear that allows control of on/off, color, and cadence for the LED. Further, physical location values may be retrieved from NEPIC or wirelessly via the dust cap, which physical location values may be possibly saved in memory on the dust cover. Alternatively, the physical location values may be obtained from a mobile device or the cloud. During some power up events, initial connections, or communication events with the NEPIC (if dust cap is battery powered), the dust cap may retrieve physical location values, port number, cable type, length etc. from the NEPIC. In some scenarios, the dust cap may also rely solely on memory values saved at initial installation time. When using a NEPIC, part of the location information is identified locally by the installer when the NEPIC is connected to panels and ports, e.g. to which port the NEPIC is connected. Other information, the location, panel, the cable configured to the port, is retrieved from a centralized DB in the cloud. The information may be pushed to the NEPIC from a mobile device, by the installer, or by a NEPIC-cloud direct connection.

In at least one exemplary embodiment, action 604 represents when an installer turns on the switch or presses a button on the dust cap. When the switch is turned on, the dust cap transmits a signal to the mobile device. As represented in screen 602B, when the mobile device receives the signal, the mobile device identifies the connector associated with the dust cap such that the connector associated with the dust cap is distinguished from the other connectors that are in communication with the mobile device. For example, as shown in screen 602B, someone turned on the switch associated with connector 123456789003 and as such, the information associated with connector 123456789003 is set apart from the data associated with other connectors. In one embodiment, the connector 12345678903 is pushed to the top of the list of connectors. Alternatively, the connector 12345678903 may be highlighted. The information associated with the connector may have unique identifiers, or may have no identifiers and may be identified by location such as closet 1, panel 2, port 3, among other descriptive unique identifiers.

In a further embodiment, action 606 may also be performed. When action 606 is performed, an individual selects one of the connectors in a list of connectors as shown on either of screen 602A or 602B. When a connector is selected, screen 602C or something similar thereto may be displayed. Screen 602c illustrates data associated with a selected connector. In at least one example, when a switch is turned on that is associated with a connector having ID number 123456789003. The selection of the connector may cause the information associated with the connector entry to jump to top of screen so a user can easily identify the desired connector. Alternatively, when a user selects a connector on the screen, different details associated with the connector may be displayed. Further, when a user makes a selection on the screen, the associated LED may momentarily flash, change color, or cadence to indicate that a particular dust cap/connector has been selected. Alternatively, a user may also turn an LED on to confirm identification of the correct connector. Also, a user may set values on the mobile device for the selected cap/connector. For example, a user may set intervals for advertising a beacon to either improve response time or extend intervals to save power. Accordingly, information about the location of a dust cap can be provided through a personal area network to a mobile device and the operation of the dust cap may be controlled through the mobile device.

Figure 7:
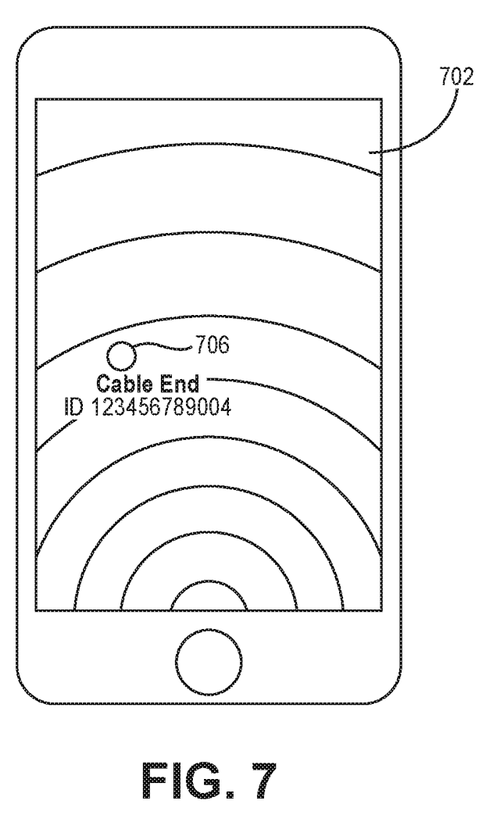
FIG. 7 is a diagram illustrating an exemplary embodiment of a screen on a device, where the screen aids in locating connected dust caps.

FIG. 7 illustrates a screen capture for an application that is executing on a mobile device, where the screen capture shows a locator screen 702 that aids a user in finding the actual cable end. In certain implementations, the locator screen 702 may be accessed through selecting a cable end ID number in a list of cable end IDs such as those illustrated in and discussed in relation to the screen captures 602A-602C in FIG. 6. In alternative implementations, the locator screen 702 may also be accessed through entering a cable end ID, or cable end location data (e.g. closet identifier, shelf identifier, panel identifier, and/or port identifier) directly, or through other means. In the illustrated embodiment, the location of the cable end may be represented by the cable end representation 706. The locator screen 702 may provide a series of concentric rings, where each ring is associated with a distance from the mobile device. The cable end representation 706 may then be placed at a location on the screen that indicates the distance of the cable end from the mobile device. For example, the rings having the smaller radius may be associated with distances closer to the mobile device and as the radius of the concentric rings increase, the rings are associated with increasing distances from the mobile device. In at least one implementation, the location of the cable end representation 706 on the screen may also indicate a direction in conjunction with the distance from the mobile device; for example, time of flight and angle of arrival techniques may be used to determine location. As shown, the location of the cable end representation is shown with concentric rings; however, other displays that are capable of illustrating relative distances or locations may also be used. For example, the display may also display the relative locations using a square grid, no grid, or other method of illustrating relative locations. When the cable end representation 706 is displayed on the locator screen, as the user moves, the relative location of the cable end with respect to the location of the mobile device as shown on the screen may also change to reflect the change in the actual distance between the mobile device and the cable end. Further, the locator screen may display multiple cable ends.

Example Embodiments

Example 1 includes a system for identifying a cable end, the system comprising: a near end for the cable, wherein the near end is visible; a far end for the cable, wherein the far end is in a hidden location; a cover assembly connected to the far end of the cable, wherein the cover assembly includes a near field communication device and a transponder, wherein the near field communication device transmits a signal through the transponder; and a device configured to communicate with the near field communication device, and further configured to facilitate a user to find the location of the cap connected to the far end.

Example 2 includes the system of Example 1, wherein the near field communication device is an RFID tag.

Example 3 includes the system of Example 2, wherein the device is configured to communicate with the RFID tag through an RFID interrogator.

Example 4 includes the system of any of Examples 1-3, wherein the RFID tag is an active RFID tag that is configured to receive power from the near end of the cable.

Example 5 includes the system of any of Examples 1-4, wherein the system further comprises a near end power and interface converter (NEPIC), the NEPIC connecting to the near end.

Example 6 includes the system of Example 5, wherein the NEPIC is configured to provide power through the cable to the near field communication device.

Example 7 includes the system of Example 6, wherein the near field communication device is configured to communicate with the device through a personal area network.

Example 8 includes the system of Example 7, wherein the personal area network is configured to communicate using at least one of: a Bluetooth network; an 802.15.4 network; and a Bluetooth Low Energy network; and ZigBee network.

Example 9 includes the system of any of Examples 5-8, wherein the NEPIC is configured to receive information from the cover assembly, and to transmit such information to the device.

Example 10 includes the system of any of Examples 1-9, wherein the cap includes a switch, wherein the switch is configured to cause the device to identify the cover assembly on a screen of the device.

Example 11 includes the system of any of Examples 1-10, wherein the device is configured to control the operation of the cover assembly.

Example 12 includes the system of any of Examples 1-11, wherein the cover assembly includes an LED, wherein the operation of the LED is configured to be controlled by the device.

Example 13 includes the system of any of Examples 1-12, wherein the device is configured to indicate the location of the near field communication device in relation to the location of the device.

Example 14 includes a dust cap for terminating a cable, the dust cap comprising: a near field communication device; a serial communication interface, coupled to a plurality of conductors in the cable; and a transponder, wherein the near field communication device is configured to communicate through the transponder with a device.

Example 15 includes the dust cap of Example 14, wherein the near field communication device is an RFID tag.

Example 16 includes the dust cap of Example 15, wherein the device is configured to communicate with the RFID tag through an RFID interrogator.

Example 17 includes the dust cap of any of Examples 14-16, wherein the RFID tag is an active RFID tag that is configured to receive power from the near end of the cable.

Example 18 includes the dust cap of any of Examples 14-17, wherein the dust cap is coupled to a far end of the cable and a near end at an opposite end of the cable is coupled to a near end power and interface converter (NEPIC), the NEPIC connecting to the near end.

Example 19 includes the dust cap of Example 18, wherein dust cap is configured to receive power from the NEPIC through the cable.

Example 20 includes the dust cap of any of Examples 18-19, wherein the NEPIC is configured to receive information from the dust cap, and to transmit such information to the device.

Example 21 includes the dust cap of any of Examples 14-20, wherein the near field communication device is configured to communicate with the device through a personal area network.

Example 22 includes the dust cap of any of Examples 14-21, further comprising a switch that is configured to cause the device to identify the cap on a screen of the device.

Example 23 includes the dust cap of any of Examples 14-22, wherein the device is configured to control the operation of the cap.

Example 24 includes the dust cap of any of Examples 14-23, wherein the cap includes an LED, wherein the operation of the LED is configured to be controlled by the device.

Example 25 includes a method for locating a cable end, the method comprising: connecting a dust cap to a far end of a cable; electrically coupling a near end power and interface converter to a near end of the cable; and transmitting a beacon from a near field communication device on the dust cap to a device.

Example 26 includes the method of Example 25, wherein transmitting the beacon from the near field communication device comprises transmitting a beacon from an RFID tag.

Example 27 includes the method of Example 26, further comprising communicating with an RFID interrogator.

Example 28 includes the method of any of Examples 26-27, wherein transmitting the beacon from the RFID tag comprises transmitting a beacon from an active RFID tag that receives power from the near end power and interface converter.

Example 29 includes the method of any of Examples 25-28, wherein transmitting the beacon further comprises transmitting the beacon to the device through a personal area network.

Example 30 includes the method of any of Examples 25-29, further comprising transmitting information for the near end power and interface converter through the near field communication device.

Example 31 includes the method of any of Examples 25-30, further comprising: pressing a switch on the dust cap, wherein the near field communication device transmits a signal to the device when the switch is pressed; and identifying the dust cap on a screen of the device.

Example 32 includes the method of Example 31, wherein identifying the dust cap on the screen of the device further comprises identifying a location of the dust cap in relation to a location of the device.

A number of embodiments have been described. Nevertheless, it will be understood that various modifications to the described embodiments may be made without departing from the spirit and scope of the claimed invention. Also, combinations of the individual features of the above-described embodiments are considered within the scope of the inventions disclosed here.

What is claimed is:

1. A method for locating a cable end, the method comprising:
    connecting a cover assembly, comprising a first communication device and memory circuitry configured to store an identifier, to a far end of a cable, wherein the identifier is uniquely associated with the far end, wherein the far end is configured to be electromechanically connected to a networked device, and wherein the cover assembly mechanically covers the far end so that the far end cannot be electromechanically connected to the networked device without first disconnecting the cover assembly therefrom; and
    upon receiving electrical power at the first communication device to power the first communication device, transmitting a beacon from the first communication device to a second communication device.

2. The method of claim 1, wherein transmitting the beacon from the first communication device comprises transmitting a beacon from a radio frequency identification (RFID) tag.

3. The method of claim 2, further comprising communicating with an RFID interrogator.

4. The method of claim 2, wherein transmitting the beacon from the RFID tag comprises transmitting a beacon from an active RFID tag that receives power from a near end power and interface converter.

5. The method of claim 1, wherein transmitting the beacon further comprises transmitting the beacon to the second communication device through a personal area network.

6. The method of claim 1, further comprising transmitting information for a near end power and interface converter through the first communication device.

7. The method of claim 1, further comprising:
    actuating a switch on the dust cap, wherein the first communication device transmits a signal to the second communication device when the switch is pressed; and
    identifying the cover assembly on a screen of the second communication device.

8. The method of claim 7, wherein identifying the cover assembly on the screen of the second communication device further comprises identifying a location of the cover assembly in relation to a location of the second communication device.

9. An apparatus, comprising:
    cover assembly circuitry, comprising a first communication device and memory circuitry configured to store an identifier, configured to be connected to a far end of a cable, wherein the identifier is uniquely associated with the far end, wherein the far end is configured to be electromechanically connected to a networked device, and wherein the cover assembly mechanically covers the far end so that the far end cannot be electromechanically connected to the networked device without first disconnecting the cover assembly therefrom;
    wherein the cover assembly circuitry comprises a first communication circuitry; and
    wherein upon receiving electrical power at the first communication device to power the first communication device, the first communication circuitry is configured to transmit a beacon to second communication circuitry.

10. The apparatus of claim 9, wherein the first communication circuitry comprises radio frequency identification (RFID) tag circuitry.

11. The apparatus of claim 10, wherein the RFID tag circuitry is configured to communicate with an RFID interrogator.

12. The apparatus of claim 9, wherein the RFID tag circuitry comprises active RFID tag circuitry configured to receive power from near end power and interface converter circuitry.

13. The apparatus of claim 9, wherein the first communication circuitry is further configured to transmit a beacon to second communication circuitry through a personal area network.

14. The apparatus of claim 9, further comprising near end power and interface converter circuitry configured to receive information through the first communication circuitry.

15. The apparatus of claim 9, further comprising:
switch circuitry;
wherein when the switch circuitry is actuated, the first communication circuitry is configured to transmit a signal to the second communication circuitry; and
wherein the second communication circuitry comprises a display; and
wherein the second communication circuitry is configured to identify the cover assembly circuitry on the screen.

16. The apparatus of claim 15, wherein the second communication circuitry is further configured to identify a location of the cover assembly circuitry in relation to a location of the second communication circuitry.

* * * * *